United States Patent [19]

d'Alayer de Costemore d'Arc

[11] Patent Number: 4,530,014
[45] Date of Patent: Jul. 16, 1985

[54] ELECTRONIC CAMERA

[75] Inventor: Stéphane M. d'Alayer de Costemore d'Arc, Genappe, Belgium

[73] Assignee: Staar S. A., Brussels, Belgium

[21] Appl. No.: 466,065

[22] Filed: Feb. 14, 1983

[30] Foreign Application Priority Data

Feb. 16, 1982 [BE] Belgium .............................. 892.155

[51] Int. Cl.³ ............................................. H04N 5/782
[52] U.S. Cl. .................................. 360/33.1; 358/906; 360/35.1
[58] Field of Search ....................... 360/33.1, 35.1, 79; 358/335, 906

[56] References Cited

U.S. PATENT DOCUMENTS 4,130,834 12/1978 Mender et al. ...................... 360/35.1
4,163,256  7/1979 Adcock .............................. 360/35.1
4,280,151  7/1981 Tsunekawa et al. ................ 360/33.1
4,442,462  4/1984 Kimura .............................. 358/906

FOREIGN PATENT DOCUMENTS 2802670  7/1979  Fed. Rep. of Germany ...... 358/906

Primary Examiner—Donald McElheny, Jr.
Attorney, Agent, or Firm—Leydig, Voit, Osann, Mayer and Holt, Ltd.

[57] ABSTRACT

A photographic camera converting a captured optical image to a series of electronic signals is disclosed comprising a recording mechanism to record these signals including a recording head which executes transverse scanning movements with reference to a magnetic record medium so that at least one scanning movement corresponds to each image. The magnetic record medium is contained within a cassette that is removable from the camera body.

13 Claims, 25 Drawing Figures

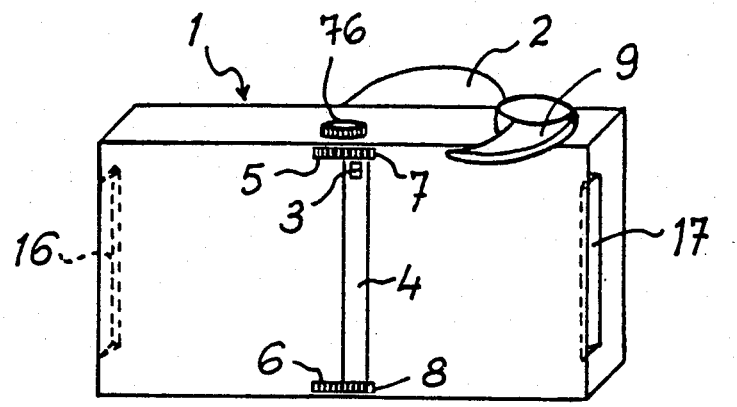
FIG. 1
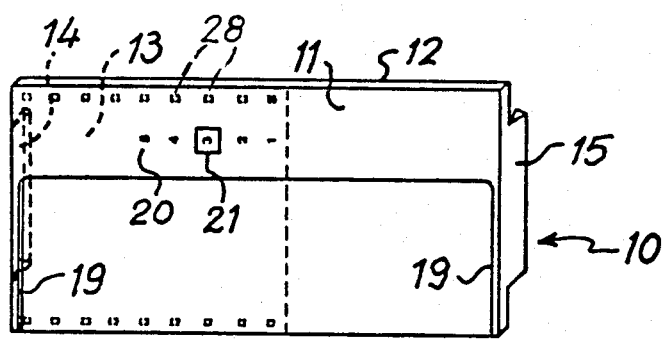
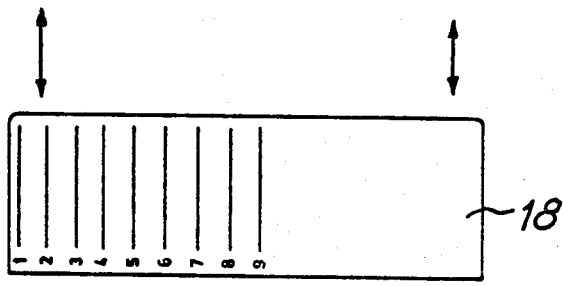
FIG. 2

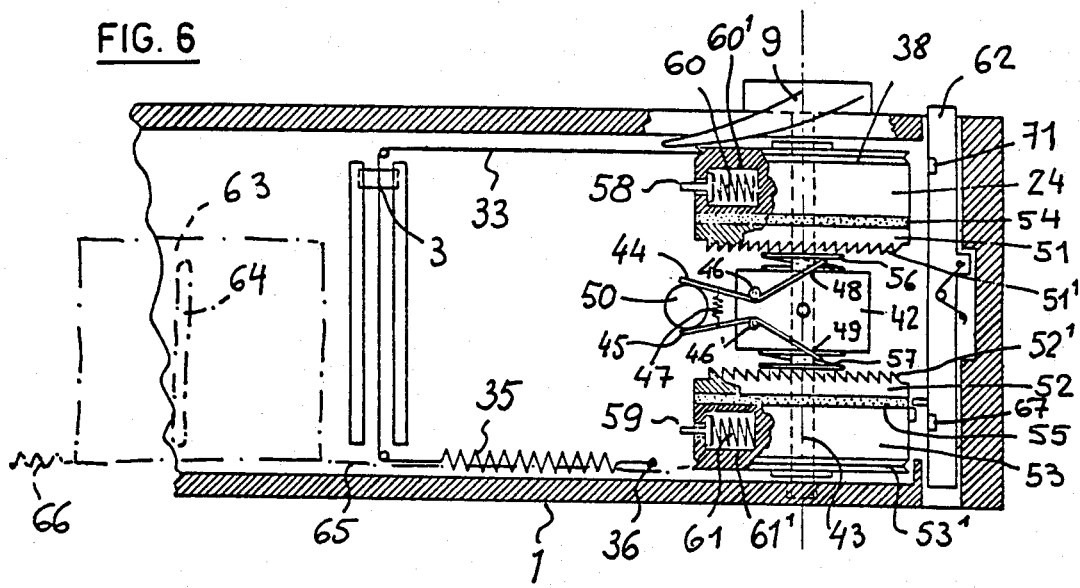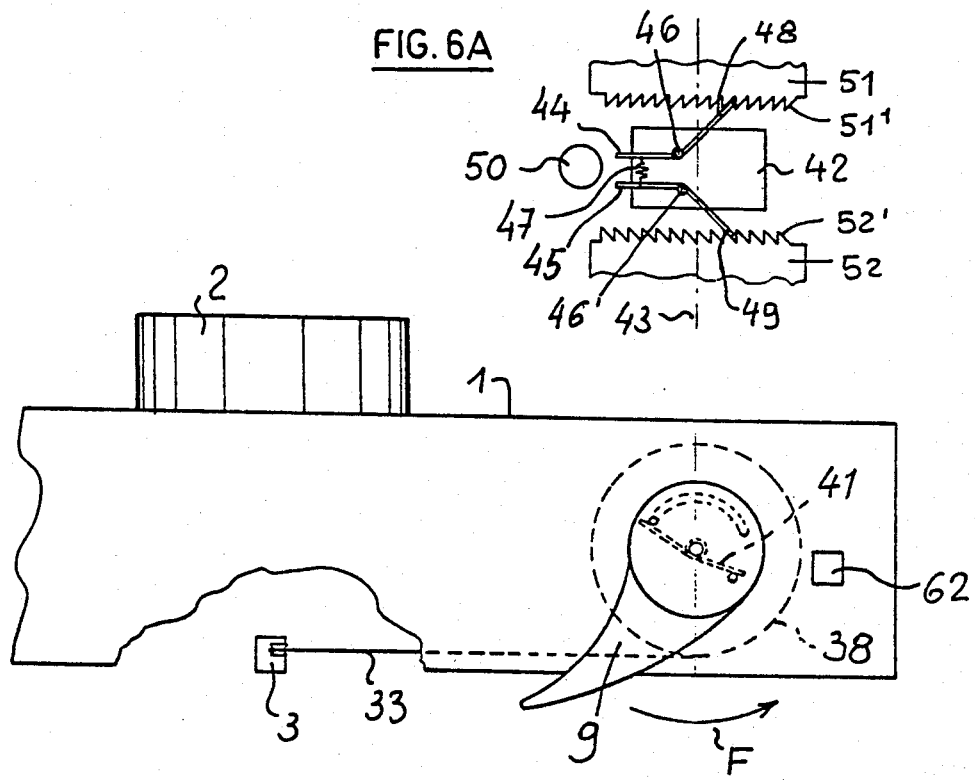

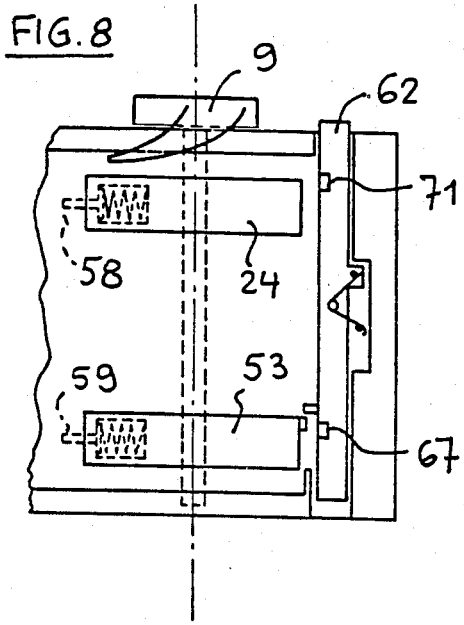
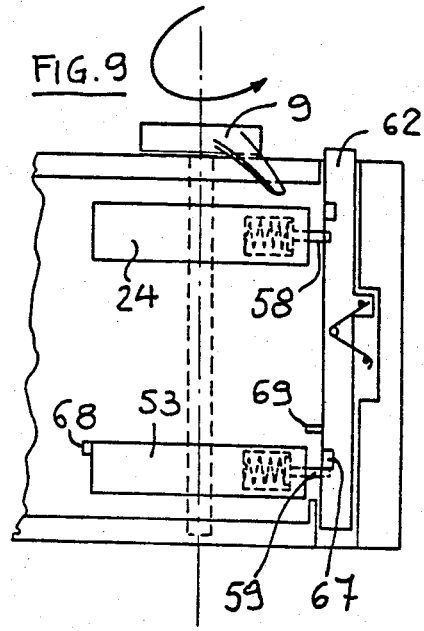
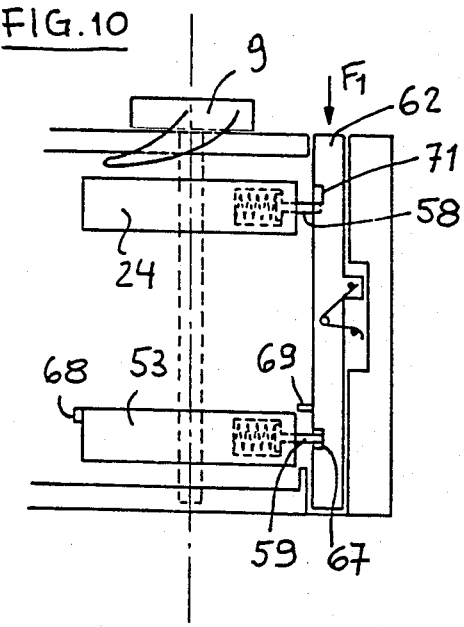
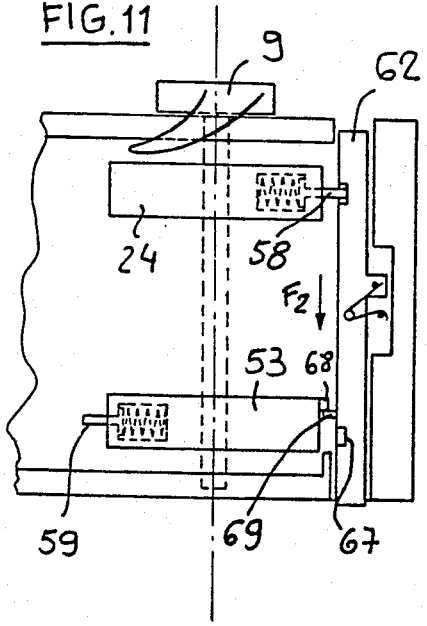

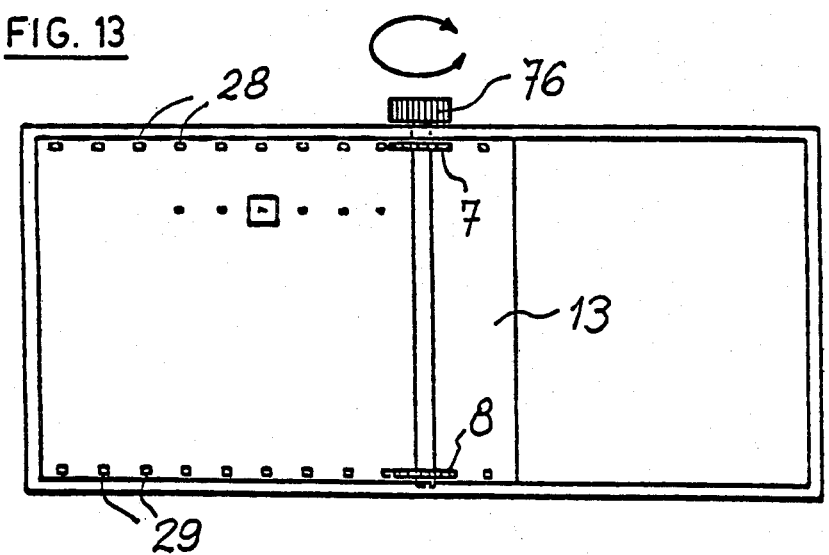
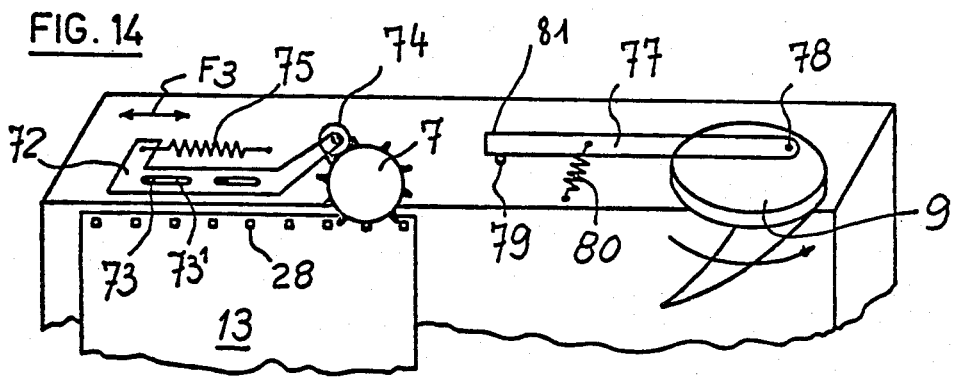
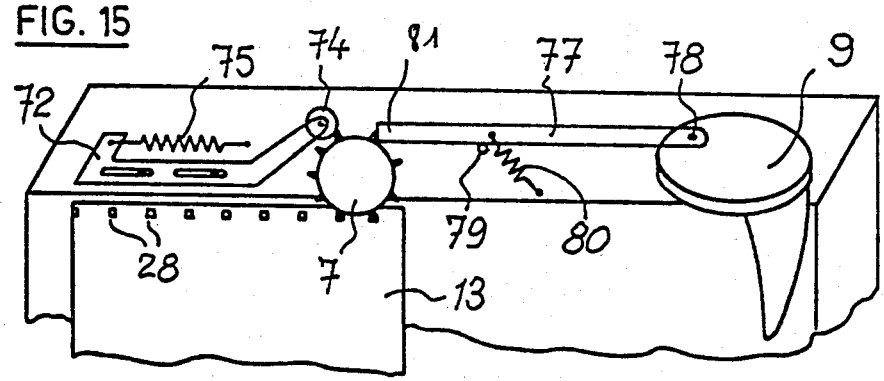

ELECTRONIC CAMERA

TECHNICAL FIELD

This invention relates to a photographic camera having means for recording images electronically by converting a captured optical image into a series of electronic signals and recording these signals on a magnetic record medium.

BACKGROUND ART

Cameras of this type have been developed recently which have a magnetic record medium in the form of a disc driven by an electric motor. Each image is recorded on a concentric track.

Such an image recording system has a number of drawbacks, e.g., poor recorded images due to vibrations caused by the driving parts in motion during the shooting, high weight due to the motor components necessary for driving the disc, and large-capacity electric batteries or cells, and large external dimensions of the housing required for the various components.

DISCLOSURE OF THE INVENTION

The principal object of this invention is to provide a photographic camera in which images are converted to electronic signals and recorded on a magnetic medium which is very simple, very light, low cost to manufacture, and comparable in size to a conventional photographic camera.

Another object is to provide for such a camera a cassette containing a magnetic record medium on which electronic signals may be recorded corresponding to optical images.

A further object is to provide a camera having a magnetic head or heads which are movable to execute a transverse scanning movement for recording electronic signals on a magnetic record medium corresponding to optical images, the magnetic record medium being fixed during the recording step and moved between recording operations so that a single scanning movement and recording trace corresponds to each image.

Another object is to provide a camera in which the magnetic record medium is moved between recordings by the same mechanism used for setting or cocking the shutter of the camera.

Another important object is to provide a cassette for containing a magnetic record medium which is removable from the camera and has provision for access of driving means to position the magnetic record medium within the cassette.

BRIEF DESCRIPTION OF THE DRAWINGS

Further objects will become clear from the following description taken in conjunction with the accompanying drawings, in which:

FIG. 1 is a rear perspective view of a camera embodying the invention;

FIG. 2 is a view of a cassette with magnetic record medium for the camera of FIG. 1;

FIG. 6 is a schematic view with parts in section showing the operating mechanism for the recording head;

FIGS. 6A to 12D are detailed views of the operating mechanism for the recording head and the shutter;

FIGS. 13 to 15 are schematic views showing the operating mechanism for the magnetic record medium;

FIGS. 16 and 16A show an alternative cassette construction for a large-capacity magnetic record medium.

BEST MODE FOR CARRYING OUT THE INVENTION

Figure 3:
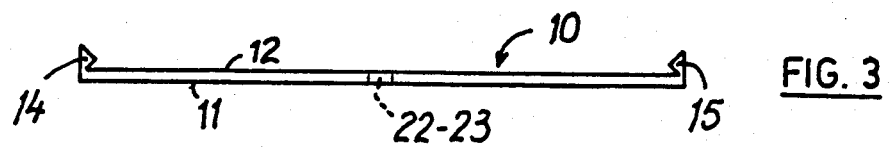
FIGS. 3, 4 and 4A are detailed views of the cassette.

Turning to FIG. 1 of the drawings, a photographic camera has a housing 1 and a lens 2. The image passing through the lens 2 is projected onto charge coupled devices for converting each optical image into a series of electronic signals. This operation being known, per se, will not be described further here.

According to this invention, the camera is provided with a record medium 13, preferably a rectangular plastic sheet with a magnetic coating, housed in a cassette 10 (FIG. 2) for recording electronic signals derived from the converting means. The camera also is provided with a recording means, herein shown as a recording head 3, movable along a path transverse to the magnetic record medium 13 and extending substantially the full height of the housing 1. The recording head 3 is visible In FIG. 1 through an elongated window 4 in the rear of the camera housing 1, which is shown open and the mechanism exposed without the cassette 10 and magnetic record medium 13 (FIG. 2) mounted in the camera.

While the recording head 3 is mounted for transverse scanning movement, the magnetic record medium 13 is movable lengthwise of the cassette 10 and camera housing 1 in a direction from left to right in FIG. 2 by an operating mechanism including toothed wheels 7, 8 which are mounted in the housing and are engagable in holes 28 in the magnetic record medium 13.

In carrying out the invention, the cassette 10 for the magnetic record medium 13 is formed by two casing halves 11, 12 between which the magnetic record medium 13 is captive and is movable by means o± the toothed wheels 7, 8 which are accessible through apertures 22, 23 in the walls of the cassette.

The cassette 10 is adapted to be mounted on and removable from the housing 1 and, for this purpose, has at each of its ends a projection 14, 15 intended to cooperate with notches 16, 17 in the housing 1, which permits the insertion and the locking of the cassette in position.

The walls of the cassette casing are sufficiently flexible for the projections 14, 15 to be able to penetrate by pressure into the notches 16, 17 to retain the cassette 10 firmly in the housing 1.

The recording head 3 records electronic signals corresponding to each image upon the magnetic record medium 13 while the latter is in fixed position, the movement of the magnetic record medium being carried out between recording steps to allow separate recording of a plurality of images.

A label 18 (FIG. 2) which may be removable or fixed and which, in the example illustrated, is slid into a groove 19 provided in the cassette 10 permits the writing of data (numbering and/or titles) to identify the images photographed with the camera and corresponding to marks 20 printed on the magnetic record medium 13 and visible through a window 21 formed in the rear wall of the cassette 10.

Figure 4:
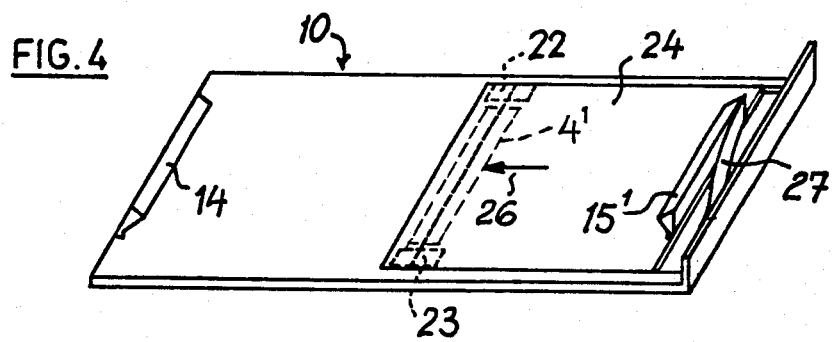
Figure 4A:
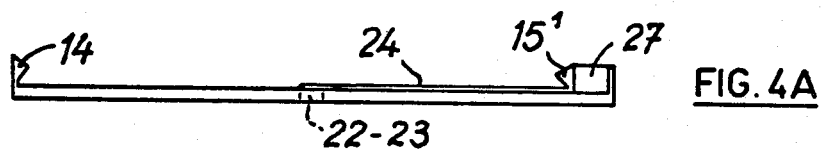

Transverse apertures 22, 23 (FIG. 3) which are provided in the cassette to provide access to the magnetic record medium 13 in order to position it for recording also permit access for positioning it for reading the recordings on the magnetic record medium 13. An elongated transverse aperture 4' is also shown in FIG. 4 in the cassette 10 opposite the path of the recording head 3 to permit access by the head to the magnetic record medium 13.

A slidable door or shutter 24 (FIG. 4) is also provided in the cassette 10 and serves to block automatically the access apertures 4', 22, 23 to the magnetic record medium 13 when the cassette is removed from the photographic camera in order to protect the accessible portions of the magnetic record medium.

When the projection 14 is introduced into the notch 16 of the camera housing 1, the shutter 24 must be pushed against a leaf spring 27 (FIG. 4) so that the projection 15 may be introduced into the notch 17.

The cassette 10 is thus guided and retained in position in the camera housing. Also, after sliding, the shutter 24 exposes the apertures in the cassette.

Figure 5:
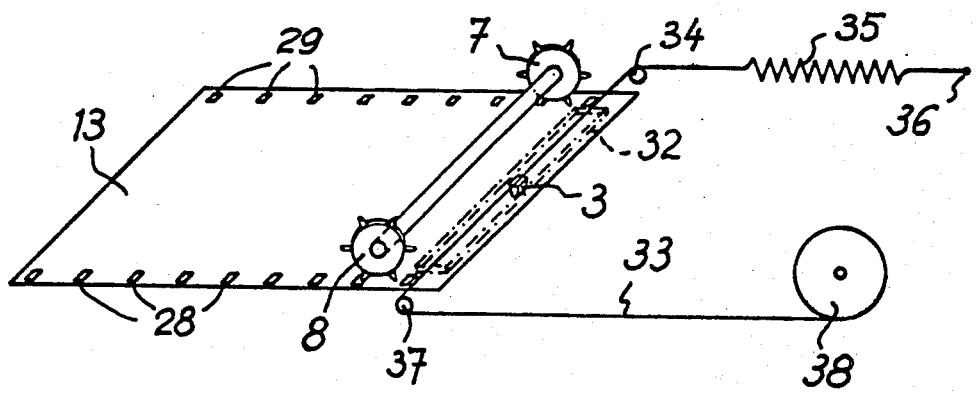
FIG. 5 is a schematic view showing the mechanism for operating the magnetic record medium and the recording head.

When the cassette is inserted in the camera housing 1, the magnetic record medium 13 is correctly positioned with reference to the recording head 3 and the perforations 28, 29 provided on the edges of the magnetic record medium 13 are accessible to and engaged by the teeth of the toothed wheels 7, 8 (FIG. 5).

Turning again to FIG. 5, the operating mechanism for the magnetic head 3 is illustrated schematically. As shown, the head 3 slides in a slideway 32 on the chassis of the camera and is driven in its cocking or setting and scanning movements by the cable 33.

This cable 33 is guided by rollers 34, 37, also mounted on the camera chassis. One of the ends of the cable 33 is fixed at 36 to the chassis of the camera through the intermediary of a spring 35. The other end is wound on a pulley 38 forming part of the setting device.

It is necessary that the camera operations of exposing images, converting the images to corresponding electronic signals and recording the signals upon the magnetic record medium be correctly synchronized.

In an entirely electronic embodiment, the "clock" circuit contained in the charge coupled devices and effecting the conversion of the photographed image into electronic signals may advantageously be used to control the succession of the above-mentioned operations.

However, for low-cost photographic cameras, it is more economical to use mechanical means to effect this synchronization.

In carrying out the invention, a mechanical means is shown for synchronizing the operation of the recording head and the conventional lens shutter of the camera, herein shown in FIGS. 6–14 as a mechanical setting and release device for the camera. Means are also provided for synchronizing the movement of the magnetic record medium 13 so that occurs between recordings as an incident to setting the shutter and recording head into a set condition.

The setting is accomplished by a cocking or setting lever 9 mounted to pivot around the axis of the shaft 43 in the direction of the arrow F counter to a return spring 41 (FIGS. 6 and 7). This lever 9 is operative to cock or set both the recording mechanism and the lens shutter. To set the recording head 3, the lever 9 is connected to wind the cable 33 on the pulley 38. To rotate the pulley 38, a plate or hub 42 fixed the shaft 43 carries on its circumference two small levers 44, 45 which pivot about axes 46, $46^1$ carried by the hub 42 and engage facing teeth $51^1$, $52^1$ provided on two spaced circular plates 51, 52 rotatable on the shaft 43.

A spring 47 tends to separate one of the ends 48, 49 of the levers 44, 45 to urge them into engagement with the teeth $51^1$ and $52^1$, as shown in FIG. 6A. At their other ends, the levers 44, 45 come into contact with a fixed stop 50 so that normally they are separated from engagement with the teeth $51^1$, $52^1$ as shown in FIG. 6.

The plates 51, 52 are operable when rotated through friction clutches 54, 55 to drive two reels 24, 53 at opposite ends of the shaft 43. The clutches 54, 55 are engaged by the action of springs 56, 67 bearing against the hub 42. The pulley 38 for the cable 33 is integral with the reel means 24.

For cocking or setting the recording mechanism and the conventional shutter of the camera, the lever 9 is actuated in the counterclockwise direction of the arrow F (FIG. 7) which rotates the hub 42. The rear arms of the levers 44, 45 move away from the fixed stop 50 and, under the action of the spring 47, as shown in FIG. 6A, the ends 48, 49 of the levers 44, 45 engage the teeth $51^1$, $52^1$ of the two plates 51, 52. The plates 51, 52 are caused to rotate and the reels 24, 53 are thus rotated by the friction clutches 54, 55.

Housings on the circumference of the reels 24, 53 contain rods or pawls 58, 59 subject to the action of springs 60, 61 housed in circumferential cavities $60^1$, $61^1$ formed in the reels 24, 53.

During the setting operation achieved with the lever 9, the cable 33 is wound onto the pulley 38 and moves the magnetic head into its set or cocked position shown in FIG. 6, stretching the spring 35.

By virtue of a cable 65 winding onto a pulley $53^1$ integral with the reel means 53, the setting operation likewise sets a conventional shutter, schematically indicated by a shutter curtain 63 (FIG. 6), equipped with a slot 64 and subject to the influence of a spring 66.

A common pawl device is provided for both pawls 58, 59 of the reel 24 for the recording head and the reel 53 for their shutter, which pawl device comprises a rod 62 extending parallel to the axis of the shaft 43 and projecting from the housing 1 to provide an actuating knob.

Figure 12A:
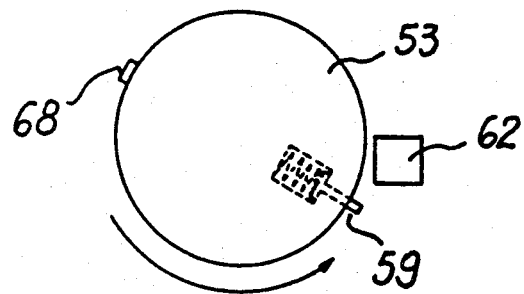
Figure 12B:
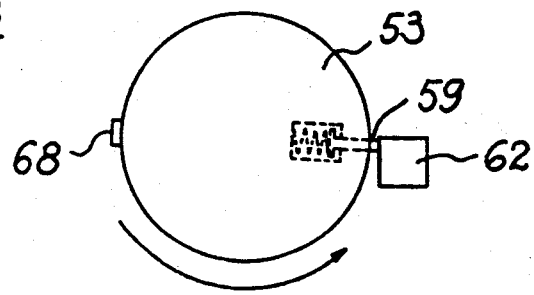
Figure 12C:
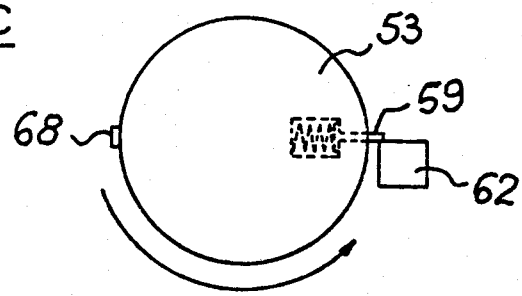
Figure 12D:
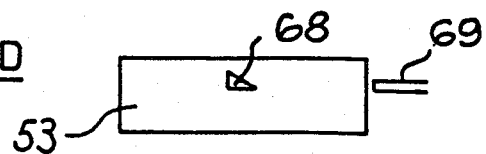

In the set position, the reels 24, 53 are held by the pawls 58, 59 which are retained by the rod 62. The shutter 63 and the recording head 3 are, therefore, maintained in set position. To set or cock the reels 24, 53, the lever 9 is rotated counterclockwise, as indicated in FIGS. 8, 9, 12A–12C, to rotate the hub 42, which carries the levers 44, 45 and the rear arms of these levers leave the fixed stop 50. Under the action of the spring 47, the ends 48, 49 of the levers 44, 45 engage the teeth of the plates 51, 52. The latter, as they rotate, drive the reels 24, 53 through the friction clutches 54, 55 which are maintained engaged by the pressure of the two springs 56, 57 bearing against the hub 42. After a rotation of approximately 180 degrees, the pawls 58, 59 pass the rod 62 and come into abutment against the back edges of the rod 62, as shown in FIG. 9 and as illustrated in FIG. 12C for the pawl 59 of the lower reel 53, which latches both reels 24, 53. The actuating lever 9 can then be released and returned without releasing the reels 24, 53, which are held by the pawls 58, 59.

The actuating lever 9 is returned to its starting position by the action of the return spring 41 (FIG. 7). During return of the lever 9 and the hub 42, the ends 48, 49 of the levers 44, 45 slide on the teeth of the plates 51, 52 and are then separated from the teeth by the levers 44, 45 coming against the stop 50.

To release the conventional lens shutter 63 and the recording head 3 and thereby operate the camera, pressure is applied to the top of rod 62 which projects from the surface of the housing 1 to move the rod 62 in the direction $F_1$ (FIG. 10). Upon movement of the rod 62, the notch 67, which is initially in the position of FIG. 9, is moved abreast of the pawl 59 in the position of FIG. 10, which releases the pawl 59 to enter the notch 67 and releases the reel 53, which is no longer retained by the pawl 59. The reel 53 rotates clockwise when released, which releases the shutter for return by the spring 66.

When the reel 53 has returned to its starting position (FIG. 8), the shutter has completed its stroke. The reel 24 and the recording head 3 remain cocked during the period the shutter is open. The circuits of the camera convert the image into signals and store the signals temporarily in electronic memory means.

To release the recording head, an inclined projection 68 (FIG. 12D) carried by the reel 53 comes, at the end of the rotational stroke of the reel 53, into engagement with a projection 69 fixed to the rod 62. The projection 68 on the reel 53 cams the rod 62 in the direction of the arrow $F_2$ (FIG. 11).

The downward movement of the rod 62 moves the notch 71 abreast of the pawl 58 to release the pawl 58 and the the reel 24 (FIG. 11), and releasing the recording head 3 which is moved by the spring 35 (FIG. 6) in its transverse scanning movement, to record the signals corresponding to the photographed image upon the magnetic record medium 13.

The scanning movement of the head, like that of the shutter, may be braked so as to obtain a transverse scanning of the recording head in a finite time.

Further in keeping with the invention, means are provided for moving the magnetic record medium 13 between recording steps in a direction to locate fresh portions of the magnetic record medium in the path of scanning movement of the head 3. For this purpose, referring to FIGS. 13–15, the toothed wheel 7 is maintained in successive angular positions by an escapement device comprising a lug 72 which is slidable in the direction of the arrow $F_3$, being guided by pegs 73 sliding in slots $73^1$ and which carries a centering roller 74 which, under the action of a spring 75, fits between the teeth of the wheel 7 to regulate the movement of the wheel in discrete steps.

For moving the magnetic record medium 13 manually, a knob 76 may be fixed to the wheels 7, 8, as shown in FIG. 13.

Alternatively, the wheels 7, 8 may be moved automatically each time the lever 9 is actuated to place the operating mechanisms for the recording head and the shutter in set condition. To this end, a lever 77 connected to the setting lever 9 by a pin 78 and guided by a stop 79 is movable in an operating stroke upon actuation of the lever 9 against the force of the spring 80 (FIGS. 14, 15). Towards the end of the stroke of the lever 9 and the lever 77, as shown in FIG. 15, the end 81 of the lever 77 comes into abutment against a tooth of the wheel 7 and rotates this reel counterclockwise by one notch counter to the centering roller 74 which completes the positioning movement of the wheel 7 under the action of the spring 75.

Figure 16:
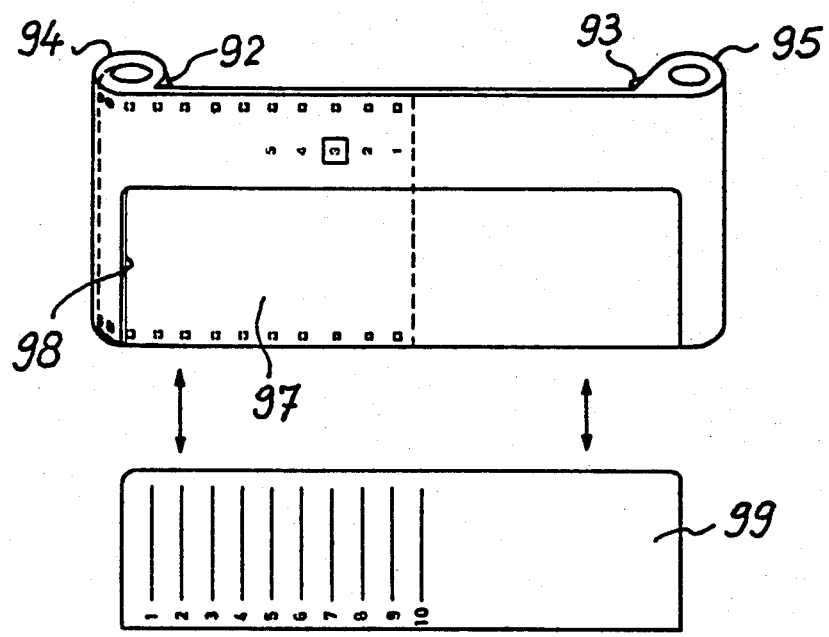
Figure 16:
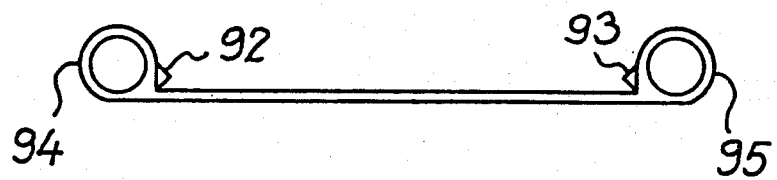

As an alternative construction, FIGS. 16 and 16A show a large capacity cassette comprising cylindrical sections 94, 95 provided to permit the unwinding and winding respectively of a flexible magnetic record medium 97 to move successive portions of the record medium adjacent the path of their recording head.

A groove 98 forming a frame serves to receive one or more program labels 99.

Figure 17:
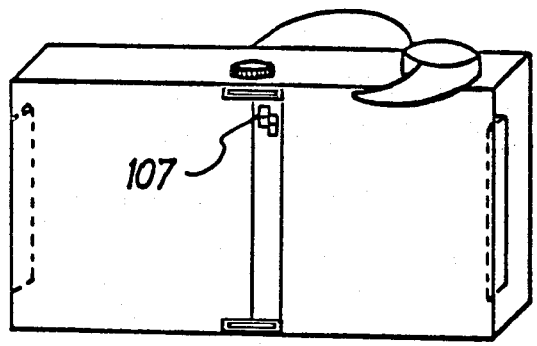
FIGS. 17 to 19 relate to alternative mechanisms for recording on magnetic record medium.
Figure 18:
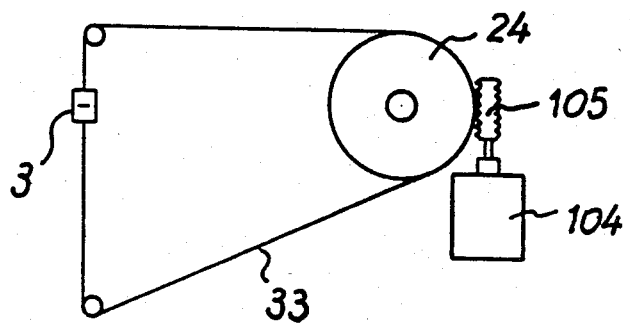
Figure 19:
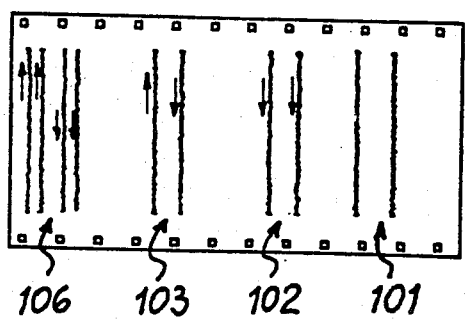

The process of recording signals corresponding to a photographic shot may be varied according to requirements, e.g., in order to make prints of greater definition or to provide a sound recording corresponding to each image recording. As specific examples, referring to FIG. 19, recording tracks as hereinbefore described are in the form of single parallel tracks 101 made by a single magnetic head, such as that illustrated at 3 (FIG. 5). Double tracks 102 are made by a double magnetic head 107 (FIG. 17) operated in the same manner as the single head 3. Two-way tracks 103 are produced by a magnetic head 3' on an endless belt 33 driven by a reversible electric motor 104 via a screw 105 coupled to the reel 24 to advance and return the head 3' (FIG. 18). Double two-way tracks are produced by a double magnetic head 107 (FIG. 17) when operated by a mechanism of the type shown in FIG. 18 having a reversible electric motor 104.

I claim:

1. A photographic camera having means for converting an optical image into a series of electronic signals comprising:

means for recording signals on a magnetic record medium including a recording head movable in transverse scanning movements relative to said record medium so that one scanning movement corresponds to each image;

a camera shutter;

an operating mechanism for opening and closing said shutter, said camera being adapted to transmit an optical image to said converting means when said shutter is open;

a removable cassette containing said magnetic record medium;

an operating mechanism mounted in said camera for moving said magnetic record medium in discrete steps lengthwise relative to said transverse scanning movements of said recording head, said cassette having an aperture permitting access for moving said magnetic record medium contained in said cassette and a transverse aperture permitting access of said recording head for recording while tape is confined within the cassette; and means for synchronizing the operation of said recording head, shutter and magnetic recording medium.

2. A photographic camera according to claim 1, said cassette having a shutter for blocking said apertures and access to the magnetic record medium when the cassette is removed from the photographic camera.

3. A photographic camera having means for converting an optical image into a series of electronic signals comprising:

means for recording signals on a magnetic record medium including a recording head movable in transverse scanning movements relative to said record medium so that one scanning movement corresponds to each image;

an operating mechanism for said recording head;

a camera shutter;

an operating mechanism for opening and closing said shutter, said camera being adapted to transmit an optical image to said converting means when said shutter is open;

common means to place said operating mechanisms for said shutter and said recording head in set condition whereby said shutter is prepared to open and said recording head is prepared to effect a scanning movement;

a removable cassette containing said magnetic record medium;

an operating mechanism mounted in said camera for moving said magnetic record medium in discrete steps lengthwise relative to said transverse scanning movements of said recording head;

said operating mechanism for moving said magnetic record medium including a toothed driving member and said magnetic recording medium including holes cooperating with teeth of said driving member.

4. A photographic camera according to claim 3 in which said operating mechanism for said recording head includes a spring, lever means to place said head operating mechanism in set condition, and means for releasing said head operating mechanism so that said spring effects the transverse scanning movement of said recording head.

5. A photographic camera according to claim 4 in which said lever means is connected to place said operating mechanisms for said shutter and said recording means in said condition.

6. A photographic camera having means for converting an optical image into a series of electronic signals comprising:

means for recording signals on a magnetic record medium including a recording head movable in transverse scanning movements relative to said record medium so that one scanning movement corresponds to each image;

an operating mechanism for said recording head;

a camera shutter;

an operating mechanism for opening and closing said shutter, said camera being adapted to transmit an optical image to said converting means when said shutter is open;

common means to place said operating mechanisms for said shutter and said recording head in set condition whereby said shutter is prepared to open and said recording head is prepared to effect a scanning movement;

a removable cassette containing said magnetic record medium;

an operating mechanism mounted in said camera for moving said magnetic record medium in discrete steps lengthwise relative to said transverse scanning movements of said recording head, said cassette having apertures permitting access for moving said magnetic record medium contained in said cassette;

said cassette including a shutter for blocking said apertures and access to the magnetic record medium when the cassette is removed from the photographic camera.

7. A photographic camera according to claim 6 in which said operating mechanism for said magnetic record medium includes an escapement device to feed the magnetic record medium in discrete steps to regulate the spacing of the recording tracks.

8. A photographic camera having means for converting an optical image into a series of electronic signals comprising:

means for recording signals on a magnetic record medium including a recording head movable in transverse scanning movements relative to said record medium so that one scanning movement corresponds to each image;

a camera shutter;

operating mechanisms for said shutter, said recording means and said magnetic record medium; and means to place said operating mechanisms for said shutter and recording means in said condition whereby said shutter is prepared to open and said recording head is prepared to effect a scanning movement and for synchronizing the release thereof.

9. A photographic camera according to claim 8 in which said operating mechanism for said shutter is movable through an operating stroke and including means for releasing said recording means from set condition at the end of the shutter mechanism operating stroke.

10. A photographic camera according to claim 8 in which said operating mechanisms include independent reel means, setting lever means for rotating said reel means and placing the same in set condition, a cable connected to said recording head and wound on one of said reel means and a cable connected to said shutter and wound on the other of said reel means and springs associated with said cables for moving said head and shutter through an operating stroke.

11. A photographic camera according to claim 10 in which friction clutches are included in said reel means for transmitting movement of said setting lever means to place said reel means in set condition.

12. A photographic camera according to claim 10 in which said operating mechanisms include pawl devices carried by the reel means cooperating with a manual control rod for operating the camera having notches to release the pawl devices.

13. A photographic camera according to claim 12 in which said pawl devices cause sequential release of said shutter and recording head and synchronize the operation thereof.

* * * * *